US012602716B2

(12) United States Patent (10) Patent No.: US 12,602,716 B2
Goenka et al. (45) Date of Patent: Apr. 14, 2026

(54) METHOD, SYSTEM, AND COMPUTER-READABLE MEDIUM FOR GENERATING RECOMMENDATIONS BASED ON ONLINE HISTORY INFORMATION AND GEOSPATIAL DATA

(71) Applicant: Yahoo Ad Tech LLC, New York, NY (US)

(72) Inventors: Mohit Goenka, Santa Clara, CA (US); Ashish Khushal Dharamshi, Sunnyvale, CA (US); Gnanavel Shanmugam, San Jose, CA (US); Nikita Varma, Milpitas, CA (US)

(73) Assignee: Yahoo Ad Tech LLC, New York, NY (US)

( * ) Notice: Subject to any disclaimer, the term of this patent is extended or adjusted under 35 U.S.C. 154(b) by 440 days.

(21) Appl. No.: 17/348,408

(22) Filed: Jun. 15, 2021

(65) Prior Publication Data

US 2021/0312525 A1 Oct. 7, 2021

Related U.S. Application Data

(63) Continuation of application No. 16/404,112, filed on May 6, 2019, now Pat. No. 11,068,959.

(51) Int. Cl.
*G06Q 30/06* (2023.01)
*G06Q 30/0601* (2023.01)
(Continued)

(52) U.S. Cl.
CPC ........ *G06Q 30/0631* (2013.01); *H04W 4/021* (2013.01); *H04W 4/024* (2018.02); *H04W 4/029* (2018.02)

(58) Field of Classification Search
None
See application file for complete search history.

(56) References Cited

U.S. PATENT DOCUMENTS 9,002,639 B2 * 4/2015 Lee ...................... G01C 21/005
701/446
9,631,944 B2 * 4/2017 Cho ................... G01C 21/3611
(Continued)

OTHER PUBLICATIONS

No Author, "Capturing traffic data using GPS-enabled cell phones" UC Berkeley Feb. 10, 2008. Retrieved from https://traffic.berkeley. edu/sites/default/files/news_pdfs/2008-02-10-machines-capturingtraf-ficdata.pdf (Year: 2008).*
(Continued)

*Primary Examiner* — Jeffrey A. Smith
*Assistant Examiner* — Jennifer V Lee
(74) *Attorney, Agent, or Firm* — Bookoff McAndrews, PLLC

(57) ABSTRACT

Disclosed are systems and methods for generating recommendations based on online history information and geospatial data. The disclosed systems and methods provide a novel framework for automating the transmission of electronic recommendations to users by consistently monitoring electronic information regarding a user's interests correlating that data with inventory information and geospatial information. The disclosed framework operates by leveraging available user data, user provided objectives, or various real-time data associated with a user, and using the aforementioned data as inputs for recommendation models, in order to generate and transmit the optimal recommendations to the user.

20 Claims, 5 Drawing Sheets

(51) Int. Cl.
    *H04W 4/021*         (2018.01)
    *H04W 4/024*         (2018.01)
    *H04W 4/029*         (2018.01)

(56)               References Cited

U.S. PATENT DOCUMENTS

| | | | |
|---|---|---|---|
| 10,803,516 B2 * | 10/2020 | Barnett | ............... G06Q 20/108 |
| 2004/0068364 A1 | 4/2004 | Zhao | |
| 2007/0129886 A1 * | 6/2007 | Toms | ................. G01C 21/3691 |
| | | | 340/995.13 |
| 2008/0218405 A1 | 9/2008 | Eckhart | |
| 2010/0004005 A1 | 1/2010 | Pereira | |
| 2014/0297455 A1 | 10/2014 | Zhao | |
| 2016/0169696 A1 | 6/2016 | Butts, III | |

OTHER PUBLICATIONS

Zhi-Mei Wang et al. "An Optimized Location-based Mobile Restaurant Recommend and Navigation System" WSEAS Transactions on Information Science and Applications Issue 5, vol. 6, May 2009, pp. 809-818 (Year: 2009).*
Chahal, Dheeraj, et al. "Migrating a recommendation system to cloud using ml workflow." Companion of the ACM/SPEC International Conference on Performance Engineering. 2020.*

* cited by examiner

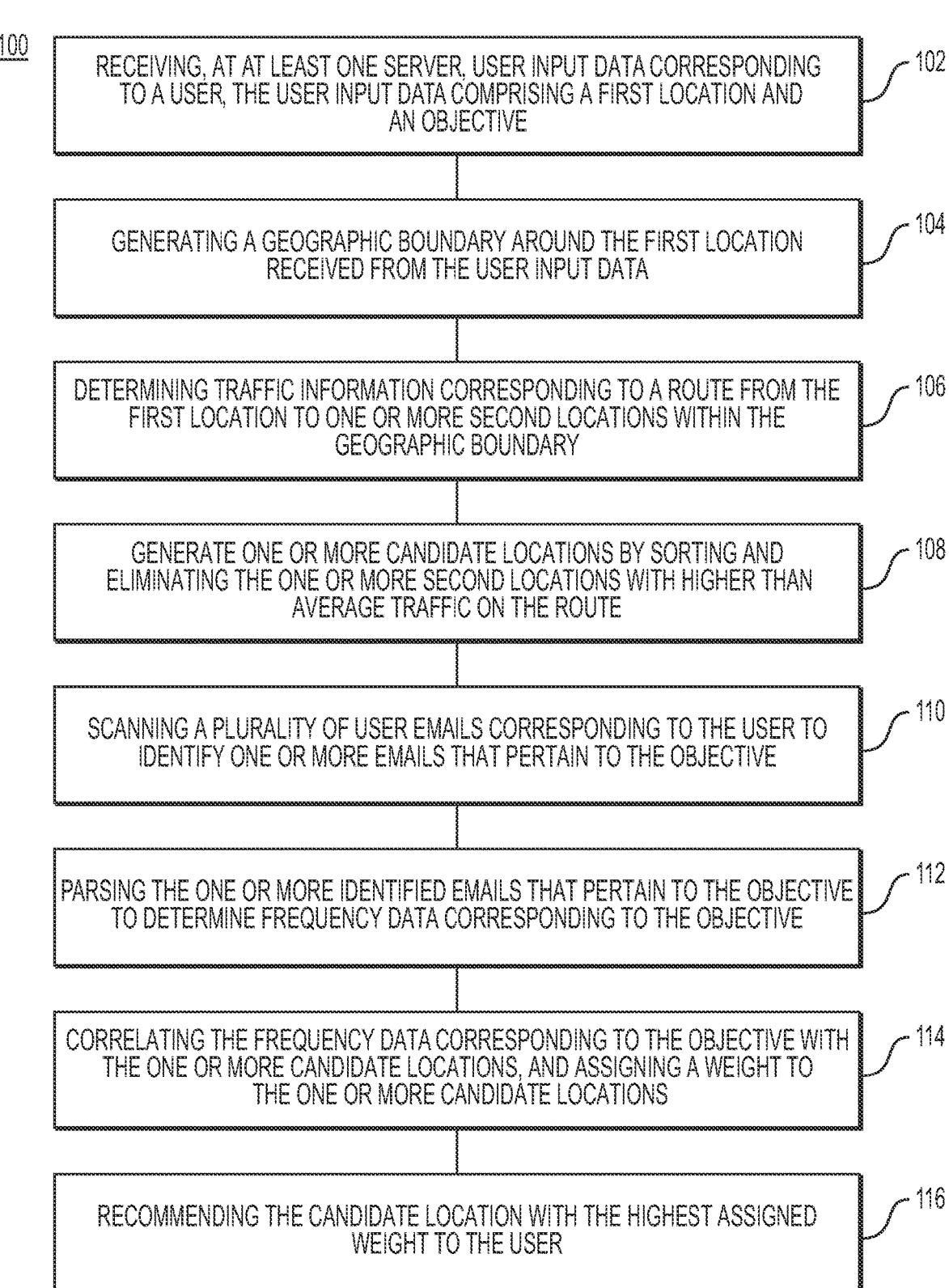

100

RECEIVING, AT AT LEAST ONE SERVER, USER INPUT DATA CORRESPONDING TO A USER, THE USER INPUT DATA COMPRISING A FIRST LOCATION AND AN OBJECTIVE — 102

GENERATING A GEOGRAPHIC BOUNDARY AROUND THE FIRST LOCATION RECEIVED FROM THE USER INPUT DATA — 104

DETERMINING TRAFFIC INFORMATION CORRESPONDING TO A ROUTE FROM THE FIRST LOCATION TO ONE OR MORE SECOND LOCATIONS WITHIN THE GEOGRAPHIC BOUNDARY — 106

GENERATE ONE OR MORE CANDIDATE LOCATIONS BY SORTING AND ELIMINATING THE ONE OR MORE SECOND LOCATIONS WITH HIGHER THAN AVERAGE TRAFFIC ON THE ROUTE — 108

SCANNING A PLURALITY OF USER EMAILS CORRESPONDING TO THE USER TO IDENTIFY ONE OR MORE EMAILS THAT PERTAIN TO THE OBJECTIVE — 110

PARSING THE ONE OR MORE IDENTIFIED EMAILS THAT PERTAIN TO THE OBJECTIVE TO DETERMINE FREQUENCY DATA CORRESPONDING TO THE OBJECTIVE — 112

CORRELATING THE FREQUENCY DATA CORRESPONDING TO THE OBJECTIVE WITH THE ONE OR MORE CANDIDATE LOCATIONS, AND ASSIGNING A WEIGHT TO THE ONE OR MORE CANDIDATE LOCATIONS — 114

RECOMMENDING THE CANDIDATE LOCATION WITH THE HIGHEST ASSIGNED WEIGHT TO THE USER — 116

*FIG. 1*

1. CURRENT HOME ADDRESS
2. RECOMMENDED HOME
   PURCHASE ADDRESS
3. WORK ADDRESS

VERY HIGH
USER ACTIVITY

VERY LITTLE
USER ACTIVITY

METHOD, SYSTEM, AND COMPUTER-READABLE MEDIUM FOR GENERATING RECOMMENDATIONS BASED ON ONLINE HISTORY INFORMATION AND GEOSPATIAL DATA

CROSS-REFERENCE TO RELATED APPLICATION(S)

This application is a continuation application of and claims the benefit of priority to pending prior U.S. Nonprovisional patent application Ser. No. 16/404,112, filed May 6, 2019, which is incorporated herein by reference in its entirety.

DETAILED DESCRIPTION

Technical Field

The present disclosure relates to techniques for generating recommendations to users based on historical shopping information and user location information.

BACKGROUND

There are many websites and applications that make user recommendations or present targeted content regarding a user interest. Conventional services typically rely solely on user input data in order to determine the best recommendation to present to a user. For example, a typical home buying website may provide a user with prospective locations for buying a home based solely on user preferences (e.g. a user's desire to live in a certain zip code). However, these conventional services often fail to consider the variables that would present the user with the true cost of engaging in the recommended product or service. The following disclosure provides a solution to the aforementioned technological void.

SUMMARY OF THE DISCLOSURE

Embodiments of the present disclosure include systems and methods for recommending and initiating communication between users based on machine learning techniques.

According to certain embodiments, computer-implemented methods are disclosed for recommending where to conduct a transaction. One method may include receiving, at at least one server, user input data corresponding to a user comprising a first location and an objective; generating a geographic boundary around the first location received from the user input data; determining traffic information corresponding to a route from the first location to one or more second locations within the geographic boundary; generating one or more candidate locations by sorting and eliminating the one or more second locations with higher than average traffic on the route; scanning a plurality of user emails corresponding to the user to identify one or more emails that pertain to the objective; parsing the one or more identified emails that pertain to the objective to determine frequency data corresponding to the objective; correlating the frequency data corresponding to the objective, to the one or more candidate locations and assigning a weight to the one more candidate locations; and recommending the candidate location with the highest assigned weight to the user.

According to certain embodiments, systems are disclosed for recommending where to conduct a transaction. One system may include receiving, at at least one server, user input data corresponding to a user, comprising a first location, and an objective; generating a geographic boundary around the first location, received from the user input data; determining traffic information corresponding to a route from the first location to one or more second locations within the geographic boundary; generate one or more candidate locations by sorting and eliminating the one or more second locations with higher than average traffic on the route; scanning a plurality of user emails corresponding to the user to identify one or more emails that pertain to the objective; parsing the one or more identified emails that pertain to the objective to determine frequency data corresponding to the objective; correlating the frequency data corresponding to the objective to the one or more candidate locations, and assigning a weight to the one more candidate locations; and recommending the candidate location with the highest assigned weight to the user.

According to certain embodiments, non-transitory computer readable medium are disclosed for recommending where to conduct a transaction. One non-transitory computer readable medium may include at at least one server, user input data corresponding to a user, comprising a first location, and an objective; generating a geographic boundary around the first location, received from the user input data; determining traffic information corresponding to a route from the first location to one or more second locations within the geographic boundary; generate one or more candidate locations by sorting and eliminating the one or more second locations with higher than average traffic on the route; scanning a plurality of user emails corresponding to the user to identify one or more emails that pertain to the objective; parsing the one or more identified emails that pertain to the objective to determine frequency data corresponding to the objective; correlating the frequency data corresponding to the objective to the one or more candidate locations, and assigning a weight to the one more candidate locations; and recommending the candidate location with the highest assigned weight to the user.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 is flow diagram illustrating steps performed in accordance with some embodiments of the present disclosure.

DETAILED DESCRIPTION OF EMBODIMENTS

Figure 2:
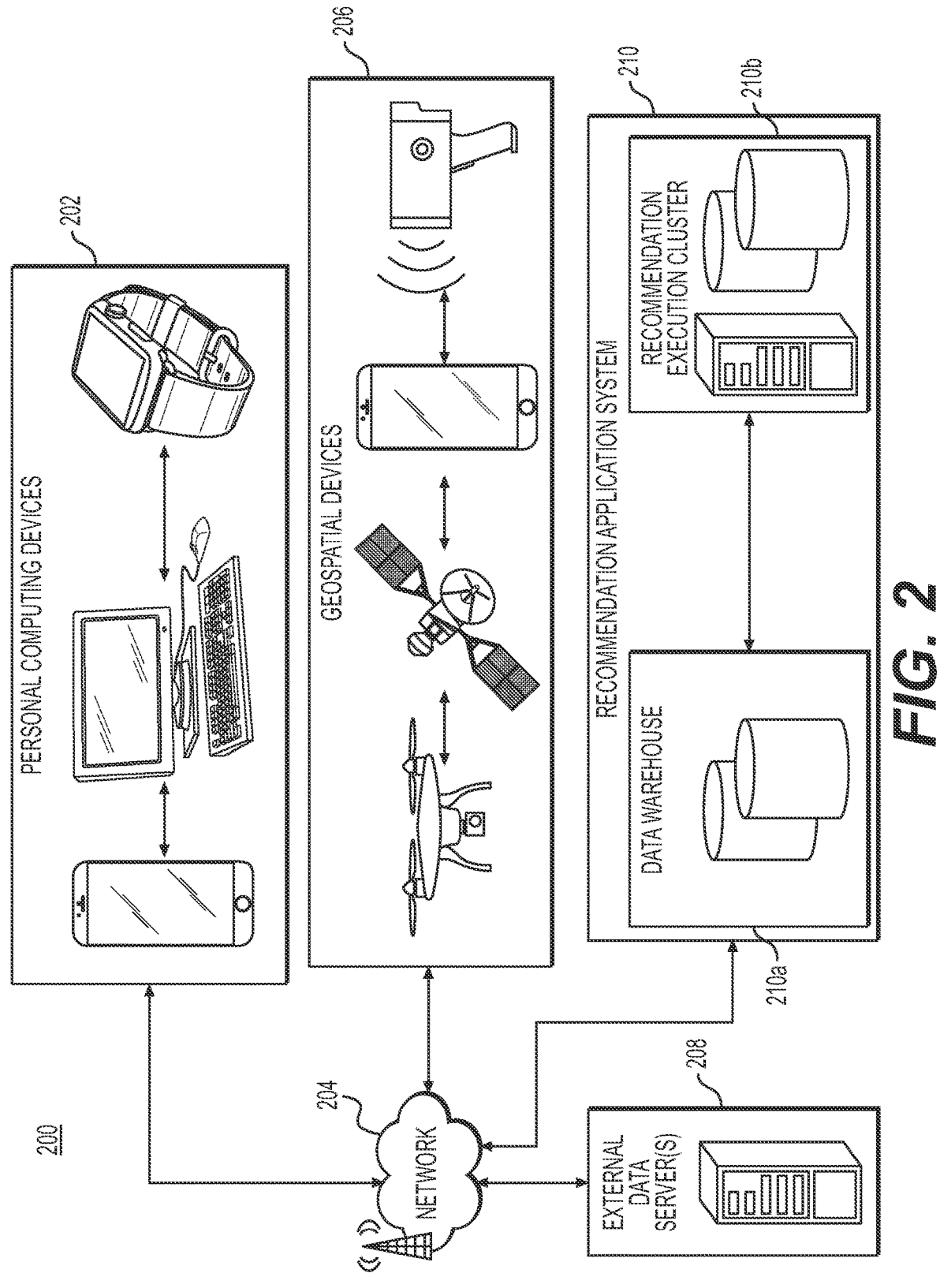
FIG. 2 is a schematic diagram illustrating an example of a network within which the systems and methods disclosed herein could be implemented according to some embodiments of the present disclosure.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for recommending where to conduct a transaction.

As described above, in the field of automating recommendations, there is a need for systems and methods capable of presenting the true cost of engaging in a product or service based on historical and real-time variables unique to a user. Conventional electronic recommendation and targeted content techniques present users with recommendations based primarily on user preferences or explore/exploit techniques implemented because of historical data of like-users. These conventional techniques lack techniques for analyzing the optimal location for a user to conduct a transaction and further fail to present the user with the data required to allow a user to make an educated decision about the true cost savings of conducting the transaction at a recommended location.

Accordingly, the present disclosure is directed to systems and methods for recommending the optimal location to fulfill a user's transaction objective (e.g. purchasing a home procuring a good) based on transportation logistic data and historical or real-time cost(s) associated with the transaction objective.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as personal computing devices with varying degrees of mobility, for example.

In short, a wireless network may include virtually any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal computing device may also include or execute an application to perform a variety of possible tasks, such as: browsing, searching, connecting to a network (e.g. the internet), receiving communications (e.g. phone call, emails, text messages, social media communications), streaming or displaying various forms of content, including locally stored or uploaded images and/or video, or games (such as live video calls).

As discussed herein, a user is an individual who uses a recommendation application system. However, the concept of a user is meant to be exemplary, as there may be one or more users, a user group, or a combination thereof, that access the recommendation application system.

The recommendation application system may establish that a user has a transaction objective, based on: parsing a user's email, a user's web browsing history, a user's online search history, new application(s) downloaded (or accessed) by the user, receiving user input, receiving data indicating an interest in the transaction objective from external servers, or any combination thereof. Herein, a transaction objective may be any type of commercial or electronic transaction, such as purchasing a home, ordering food at a restaurant, or purchasing a product, for example. One having ordinary skill in the art will recognize that the transaction objective may be a user interest in any product or service and the recommendation may be generated automatically, without the need for user input.

In one embodiment, a server corresponding to the recommendation application system may receive data indicative of a user expressing an interest in objective (e.g. purchasing a product). Based on user location data received from a mobile device, the recommendation application system will generate a geographic boundary around the current location of the user. The recommendation application system may then determine traffic information corresponding to a route from the user location to one or more second locations within the geographic boundary (e.g. brick and mortar stores) wherein the user can complete the objective. Based on the determined traffic information, the recommendation application system may then generate one or more candidate locations by sorting and eliminating the one or more second locations with higher than average traffic on the route. The recommendation application system will additionally scan a plurality of electronic communications (e.g. emails, text messages, online browsing history) corresponding to the user in order to identify one or more emails that pertain to the objective. The identified emails are then parsed in order to determine frequency data corresponding to the objective. The recommendation application system further correlates the frequency data corresponding to the objective to the one or more candidate locations and assigns a weight to the one or more candidate locations. Based on the correlation between the frequency data and one or more candidate location, the recommendation application system may recommend that the user engage in the user's objective (e.g., purchase a product) at the candidate location with the highest assigned weight. Alternatively, the recommendation application system may recommend that the user engage in the user's objective (e.g. purchase a product) via an online retailer as the cost and time savings would greater if the user completed the objective via e-commerce.

In another embodiment, a server corresponding to the recommendation application system may receive data indicative of a user expressing an interest in the objective (e.g. buying a house). Based on user location data received from a mobile device, or alternatively from known user home billing information or IP address, the recommendation application system may generate a geographic boundary around the current location of the user. The recommendation application system may then determine traffic information corresponding to a route from the user location (e.g. current home address) to one or more second locations (e.g. prospective home address, work address, or address of locations the user is known to frequent) within the geographic boundary wherein the user can complete the objective. Alternatively, the geographic boundary can be based on user input directly into an application or extrapolated from the user browsing/search history, wherein the user specified interest in a particular neighborhood or zip code. Based on the determine traffic information, the recommendation application system may then generate one or more candidate locations by sorting and eliminating the one or more second locations with higher than average traffic on the route. The recommendation application system will additionally scan a plurality of electronic communications (e.g. emails, text messages, online browsing history) corresponding to the user in order to identify one or more emails that pertain to the objective. The identified emails are then parsed in order to determine frequency data corresponding to the objective. The recommendation application system further correlates the frequency data corresponding to the objective to the one or more candidate locations and assigns a weight to the one or more candidate locations. Based on the correlation between the frequency data and one or more candidate location, the recommendation application system will recommend that the user engage in the user's objective (e.g. purchase a product) at the candidate location with the highest assigned weight. One having ordinary skill in the art will understand that this process can be completely automated and implemented without manual user input or feedback.

FIG. 1 is flow diagram illustrating a recommendation method 100 performed in accordance with some embodiments of the present disclosure. FIG. 2 is a schematic diagram illustrating an example of a recommendation application system network 200 within which the systems and methods disclosed herein could be implemented according to some embodiments of the present disclosure. An RAS network 200 may include personal computing devices 202, geospatial devices 206, external data server(s) 208, and the recommendation application system 210 all in communication with each other via network 204.

As depicted in FIG. 2, and described with respect to the method of FIG. 1, the recommendation application system ("RAS") 210 may receive, at at least one server 210*b*, user input data corresponding to a user, the user input data comprising a first location and an objective (Step 102). The user input data may be user preference data, user objective data, user location information (e.g. information identifying a personal computing device, phone number, GPS data, IP address) manually shared by the user or from data received from external data server(s) 208 or extrapolated from information received due to the user access the network 204 corresponding to the RAS 210. The RAS 210 further generates a geographic boundary around the first location received from the user input data (Step 104). The RAS may determine traffic information corresponding to a route from the first location to one or more second locations within the geographic boundary (Step 106). The geographic boundary may be circular in shape wherein the size is determined by the radius of the geographic boundary at least including one or more of the second locations. Alternatively, the geographic boundary may take the shape of zip codes, area codes, custom boundaries specified by the user, or a custom boundary established by the RAS 210 based on historical/real-time traffic patterns. The one or more second locations may be a prospective home address, work address, or address of locations the user is known to frequent, for example the gym or a retail establishment. The RAS 210 may generate one or more candidate locations by sorting and eliminating the one or more second locations with higher than average traffic on the route (Step 108). The RAS 210 may further scan a plurality of user emails corresponding to the user to identify one or more emails that pertain to the objective (Step 110). One having ordinary skill in the art will appreciate that the scanning emails is merely exemplary and the RAS 210 could scan any communication received on the network (e.g. phone/video calls, text messages, social media messages, received images, browsing history, digital media engagement: movies, music, television shows, etc.). The RAS 210 additionally parses the one or more identified emails that pertain to the objective to determine frequency data corresponding to the objective (Step 112). Parsing may involve analyzing one or more electronic communications (e.g. emails, text messages, social media messages, etc.) for receipt information, monetary information, and location information (e.g. physical address, IP address, web address), associated with previous or future user transactions. Frequency data may correspond to the number of times a the RAS 210 identifies the user has purchased an product or service, the number of times a user has visited a location, or the amount of money spent on a product or service; a counter may be incremented to accurately track frequency data. The RAS may further correlate the frequency data corresponding to the objective to the one or more candidate locations, and assign a weight to the one or more candidate locations (Step 114). The RAS 210 may recommend the candidate location with the highest assigned weight to the user (Step 116).

In accordance with the aforementioned recommendation steps 100, one or more algorithms, as disclosed below, may be implemented to determine sort and eliminate one or more second locations and generate candidate locations:

Recommending a Prospective Place to Live (e.g. Buy/Rent a House)

- a. Distance (home, work)=1 point per 1 mile
- b. Distance (home, restaurant)=1 point per 10 miles
- c. Cost of living=1 point per monetary value (e.g. dollar)
- d. Distance (home, shopping)=1 point per 5 miles
- e. Distance (work, shopping)=1 point per 4 miles Location recommendation=($a$×number of user work days)+($b$×frequency of restaurant visits)>($d\|e$)× frequency of shopping trips Recommending a Restaurant:
- a. Distance (home, restaurant)=1 point per 1 mile
- b. Restaurant savings=1 point per monetary value saved (e.g. dollar, reward points, etc.)
- c. Cost of living=1 point per monetary value (e.g. dollar) difference Location recommendation=($a$−$b$)+$c$ Recommending a Restaurant:
- a. Distance (home, shopping)=1 point per 2 miles
- b. Distance (work, shopping)=1 point per 2 mile
- c. Expected savings from =1 point per monetary value (e.g. dollar, reward points, etc.) of savings
- d. Cost of living=1 point per monetary value (e.g. dollar difference Location recommended=<($a\|b$)×(frequency of shopping trips×travel cost)−($c$+$d$)

One having ordinary skill in the art will understand that the algorithms disclosed above are not meant to be static and can be modified in real-time by the RAS 210 based on updated information regarding the user, the user's current location, traffic information, or monetary information. One having ordinary skill in the art will understand that the terms monetary value, monetary data points, and monetary information are interrelated and may be used interchangeably.

As described above, FIG. 2 is a schematic diagram illustrating an example of a recommendation application system network 200 within which the systems and methods disclosed herein could be implemented according to some embodiments of the present disclosure. An RAS network 200 may include personal computing devices 202, geospatial devices 206, external data server(s) 208, and the recommendation application system 210 all in communication with each other via network 204.

The personal computing devices 202 may include virtually any desktop or portable computing device capable of receiving and sending a message over a network, such as network 204, or the like. For example, a personal computing device 202 may be a mobile phone, a desktop computer, a laptop computer, a landline phone, a gamin system, a television, smart accessory, and/or a digital or artificial intelligence enabled personal assistant. Personal computing devices 202 may include virtually any portable computing device capable of connecting to another computing device and receiving information, as discussed above. Personal computing devices 202 may also include at least one client application (e.g. a communication application) that is configured to receive communication and/or content from another computing device. In some embodiments, mobile devices (e.g. a mobile phone) may also communicate with non-mobile personal computing services (e.g. an Amazon Alexa®), or the like. In one embodiment, such communications may include sending and/or receiving messages or voice/video calls, searching for, viewing and/or sharing photographs, digital images, audio clips, video clips, or any of a variety of other forms of communications. Personal computing devices 202 may be capable of sending or receiving signals, such as via a wired or wireless network, or may be capable of processing or storing signals, such as in memory as physical memory states, and may, therefore, operate as a server. Network 204 is configured to couple personal computing devices 202 and its components with components corresponding to the RAS 210. Network 204 may include any of a variety of wireless sub-networks that may further overlay stand-alone ad-hoc networks, and the like, to provide an infrastructure-oriented connection for the personal computing devices 202.

In general, network 204, may include local area networks ("LANs")/wide area networks ("WANs") network, wireless network, or any combination thereof, and configured to implement protocols for transmitting data in communication computing devices accessing the RAS 210. Not all the components featured in FIG. 2 may be required to practice the disclosure, and variations in the arrangement and type of the components may be made without departing from the spirit or scope of the disclosure.

The geospatial devices 206 may be any devices or sensors accessing the network 204 and capable of capturing, storing, manipulating, analyzing, managing, and presenting, historical and real-time spatial or geographic data, especially as it relates to mapping and traffic information. For example, the geospatial devices 206 may transmit geostatistical information (e.g. traffic information) to the RAS 210 to further enable the RAS 210 to implement address geocoding techniques (e.g. interpolating spatial locations (X, Y coordinates) from street addresses or any other spatially referenced data such as ZIP Codes, parcel lots and address locations), reverse geocoding techniques (e.g. returning an estimated street address number as it relates to a given coordinate. For example, a user can click on a road centerline theme (thus providing a coordinate) and have information returned that reflects the estimated house number. This house number is interpolated from a range assigned to that road segment.), geo-multi-criteria decision analysis (e.g. implementing rules or algorithms to aggregate criteria (e.g. user preferences/objectives), which allows the alternative solutions to be ranked or prioritized, which in turn may reduce costs and time involved in identifying ideal locations for a user to engage in the user objective), and generate data output/cartography (electronic creation and designing of maps, or visual representations of spatial data). Geospatial devices 206 may include, but are not limited to drones, satellites, weather balloons, mobile devices, servers, databases personal computers, tables, and static and mobile radars. Crowd sourcing techniques may implemented by correlating data gathered by a network of one or more users and correlated the gathered data from the one or more users with data received with information received by any of the aforementioned geospatial devices 206.

The external data server(s) 208 may include one or more of personal computers desktop computers, multiprocessor systems, microprocessor-based or programmable consumer electronics, database(s), network PCs, server(s), and the like, maintained by third parties storing business-to-business or business-to-consumer data (e.g. Verizon®, Apple®, Google®, Netflix®, Nordstrom® Amazon®, a government entity, or the like). The RAS 210 may receive data stored on the external data server(s) 208 on one or more of its computing devices. The data stored at the external data server(s) 208 may include, but is not limited to, information related to: product cost, service cost, product inventory, shipping costs, shipping delivery time, seating availability, seating arrangements, rewards information, weather, news, transportation (e.g. public and private data related to airplanes, rocket ships, trains, and aquatic vehicles), mobile devices (e.g. iPhone®), smart accessories (e.g. Apple Watch®), artificial intelligence enabled devices (e.g. Alexa®, Google Home®, Facebook Portal®, and the like), and GPS data corresponding to a user or a personal computing device 202. For example, the RAS 210 may receive or may be able to parse data from the external data server(s) 208 pertaining to specific user(s)/member(s)/user group(s) interests or preferences on Zillow® or Open Table® and IP addresses associated with personal computing devices receiving engaging with the service; information regarding user(s)/member(s)/user group(s) data collected by artificial intelligence personal assistants (e.g. ordering habits, user-to-user communication, reminders, user queries, and the like); personal computing device information (e.g. device signal strength, number and type of applications on the device, SIM/eSIM data, IMEI information, data stored in the cloud corresponding to the device, internet based user queries, and the like); and banking information (e.g. account balance, credit history, debt information, and the like). The RAS 210 may additionally receive global monetary data points corresponding to the cost of a product or service available via one or more online retailers and compare the online cost of the product or service to location specific monetary data points corresponding to the cost of the product or service at one or more physical retail stores within a geographic boundary encompassing or in close proximity to the user.

The RAS 210 may be further comprised of a data warehouse 210a and a recommendation execution cluster 210b. The data warehouse 210a may be any type of database or memory, and may be configured to be in direct communication with the recommendation execution cluster 210b.

The data warehouse 210a may house one or more databases storing dataset(s) of data and metadata associated with local and/or network information related to users, user recommendation profiles, members, member recommendation profiles, user groups, user group recommendation profiles, services, applications, content (e.g., video), traffic information geospatial data, and the like. Such information may be stored and indexed in the data warehouse 210a independently and/or as a linked or associated dataset. As discussed above, it should be understood that the data (and metadata) in the data warehouse 210a can be any type of information and type, whether known or to be known, without departing from the scope of the present disclosure.

recommendation execution cluster 210b may include a device that includes a recommendation analyzer (not shown) to provide recommendations to another device independently or in any type or form of content via the network 204. Devices that may operate as recommendation execution cluster 210b may include one or more of personal computers, desktop computers, multiprocessor systems, microprocessor-based or programmable consumer electronics, network PCs, server(s), and the like. recommendation execution cluster 210b can further provide a variety of services that include, but are not limited to, email services, alert/notification(s), instant messaging (IM) services, streaming and/or downloading media services, search services, photo services, web services, social networking services, news services, third-party services, audio services, video services, SMS services, MMS services, FTP services, telephony services, voice over IP (VOIP) services, gaming services, or the like. The recommendation execution cluster 210b may be configured to automatically provide recommendations and/or one or more of the aforementioned services based on the data stored in the data warehouse 210a, external data server(s) 208, and/or information received from the personal computing devices 202 or geospatial devices 206. The recommendation execution cluster 210b may be configured to perform calculations and measurements, and interpret data received from one or more personal computing devices 202, external data server(s) 208, data stored in the data warehouse 210a, external data server(s) 208, and/or information received from the geospatial devices 206. The recommendation execution cluster 210b may also make correlations between received data, and further make calculations, measurements, and determinations based on data received at a predetermined period of time, predetermined locations, predetermined user(s)/member(s)/user group(s), predetermined third parties, and/or demographics. Moreover, the recommendation execution cluster 210b may, automatically or in response to a user request, create a user recommendation profile. For example, in response to receiving data (e.g. user online history, user preferences for a product or service, information parsed from user electronic messages, user purchase history), the recommendation execution cluster 210b may create a user recommendation profile and store the user recommendation profile in the data warehouse 210a. As updated information corresponding to the user is received, the user recommendation profile may be modified to align with the updated information. The recommendation execution cluster 210b may further determine how the aforementioned algorithms should be implemented or modified and how a recommendation should be transmitted and displayed to a user. The recommendation execution cluster 210b may additionally conduct bandwidth-latency analysis to ensure that the personal computing device 202 corresponding to a user is accessing the a data warehouse 210a and/or recommendation execution cluster 210b in closest proximity to the user personal computing device 202 or that the personal computing device 202 data is being received at the a data warehouse 210a and/or recommendation execution cluster 210b with the lowest latency at the time the recommendation to the user is made. Migrating the data associated with the user to the RAS 210 components (i.e. data warehouse 210a and recommendation execution cluster 210b) in closest geographic proximity to the user or the RAS 210 components with the least latency, provides the user with the recommendation in the shortest amount of time possible on the network and opens bandwidth for additional users accessing the network 204. As such, data associated with the user may be migrated between RAS 210 components, as the known location of the user changes in a geographic region.

Figure 3:
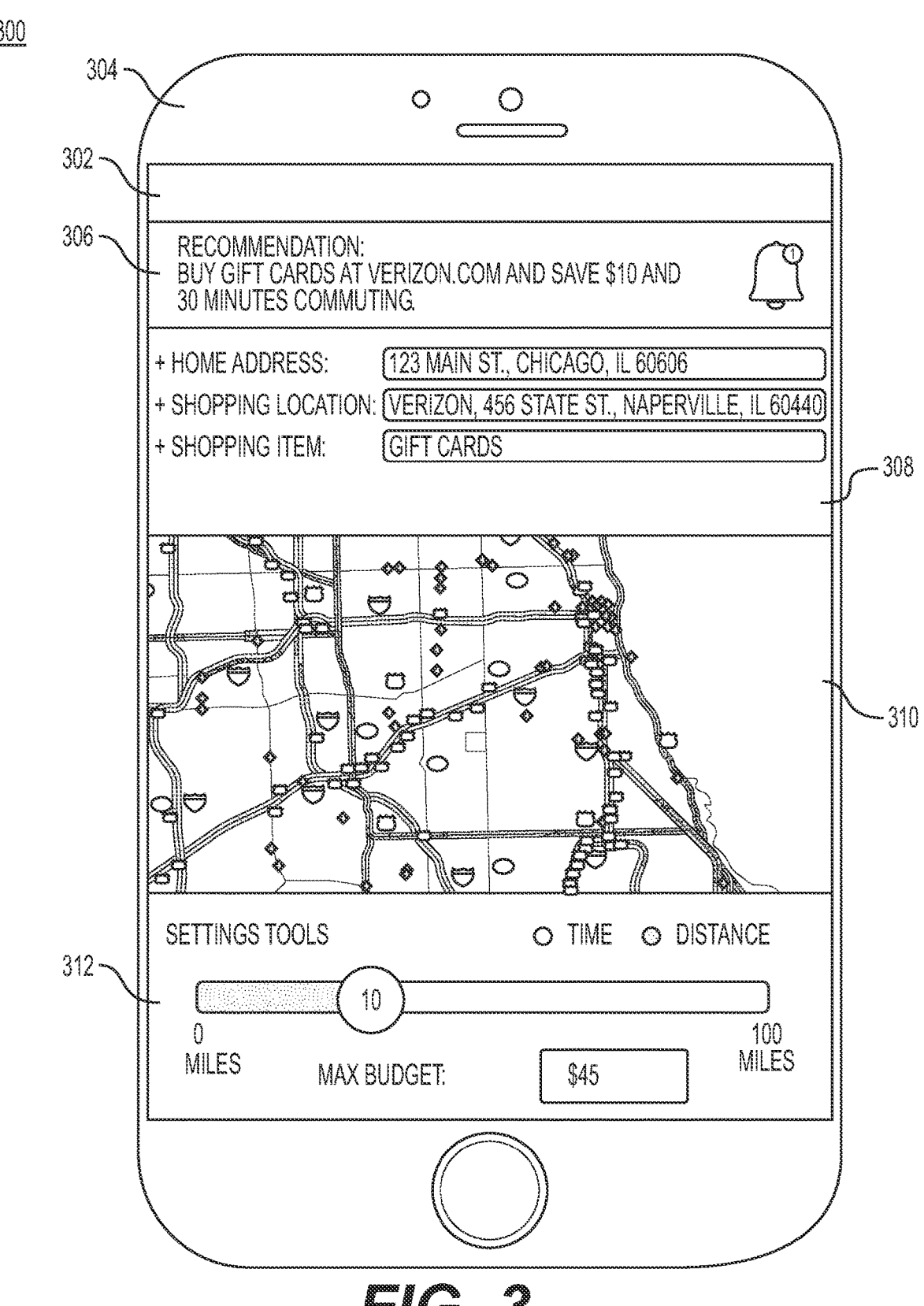
FIG. 3 depicts a graphical representation of a user interface for adjusting parameters and objectives, and receiving a recommendation on a personal computing device.

FIG. 3 depicts a graphical representation of a user interface for adjusting parameters and objectives, and receiving a recommendation on a personal computing device. Generally, a communication application will provide a user interface 302 on a personal computing device, for example a mobile device 304, so that a user can communicate their preferences, parameters, and objectives to the RAS 210. For example, via the user interface 302, users may have access to an objective menu 308, which may allow a user to input data related to an objective (e.g. a product or service) or a location. The user interface 302 may further provide a region for receiving recommendations 306, which may be static or dynamic, and displayed interstitially, in response to the layout of the other features (.e.g. the objective menu 308, cartography region 310, or objective setting tools 312) and further depending on the type of recommendation being displayed. The objective menu 308 may be static providing a pre-set number of input options or navigation options; or the objective menu 308 may be dynamic and adjust the menu based on the type of objective the user specifies. The user interface 302 may additionally provide cartography region 310 capable of displaying historical and real-time geospatial information. For example, cartography region 310 may display a map associated with a user location, which depicts information pertaining to historical or real-time traffic, historical or real-time weather conditions, and optimal forms of transportation between one or more locations. Although not shown, the user interface 302 may allow a user to control the type of recommendation they receive from the RAS 210. For example, the user interface allow user to adjust settings for: controlling the type of recommendations they receive (e.g. notification banners, emails, phone calls, video calls, text messages, etc.), and further report satisfaction with the recommendations the user has previously received. The user interface 302 may further display objective settings tools 312 for enabling and disabling certain communication application features/settings, weightings for locations and ranking preferences (e.g. time or distance to commute to a location), and accepting and declining invitations, settings budgets, and modifying rules and agreements.

Figure 4:
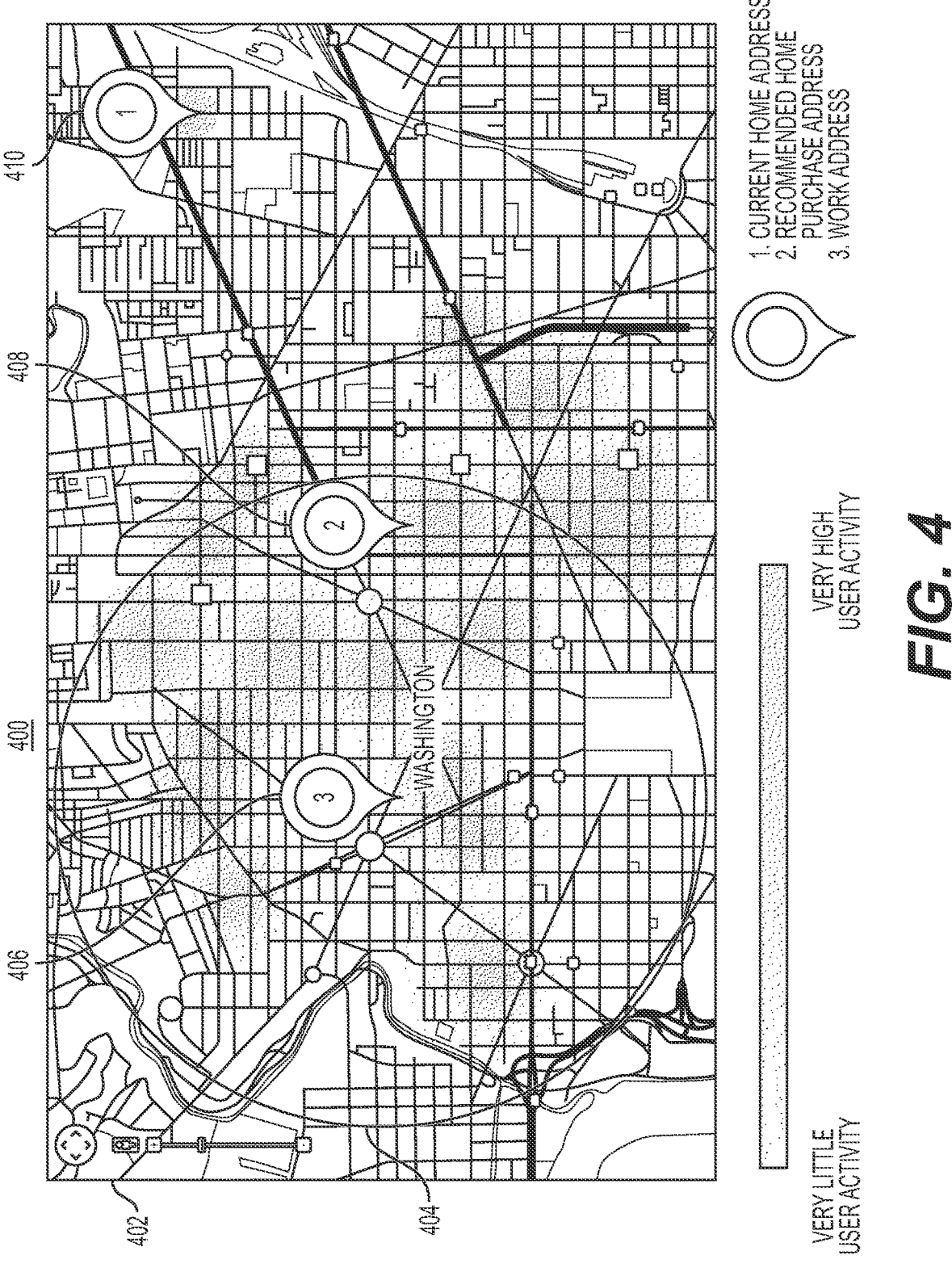
FIG. 4 depicts a graphical representation of frequency data and location recommendations on a heat map, and a visual representation of content presented to a user in an interface.

FIG. 4 depicts a graphical representation of frequency data and location recommendations on a heat map, and a visual representation of content presented to a user in an interface. Mapping environment 400 depicts an exemplary format by which cartography information is displayed to an administrator of the RAS 210 or to a user accessing the RAS 210 via a user interface 302 on a personal computing device 202. Frequency heat map 402 conveys a geographic boundary 404, and three locations (however any number of locations are possible): a work address 406, a recommended home purchase address 408, and a current home address 410. Frequency heat map 402 can be generated based on the outcome of the one or more algorithms disclosed above (e.g. the algorithm for recommending a prospective place to live), parsed data (e.g. frequency data) extrapolated from electronic communications (e.g. emails), and geostatistical data received by the RAS 210 from geospatial devices 206. The frequency data extrapolated from the parsed emails may be conveyed on the frequency heat map 402 in the form of heat signatures and heat scale, further symbolizing the number of times a user was active in a certain geographical area in comparison to other areas in the same geographical area.

Figure 5:
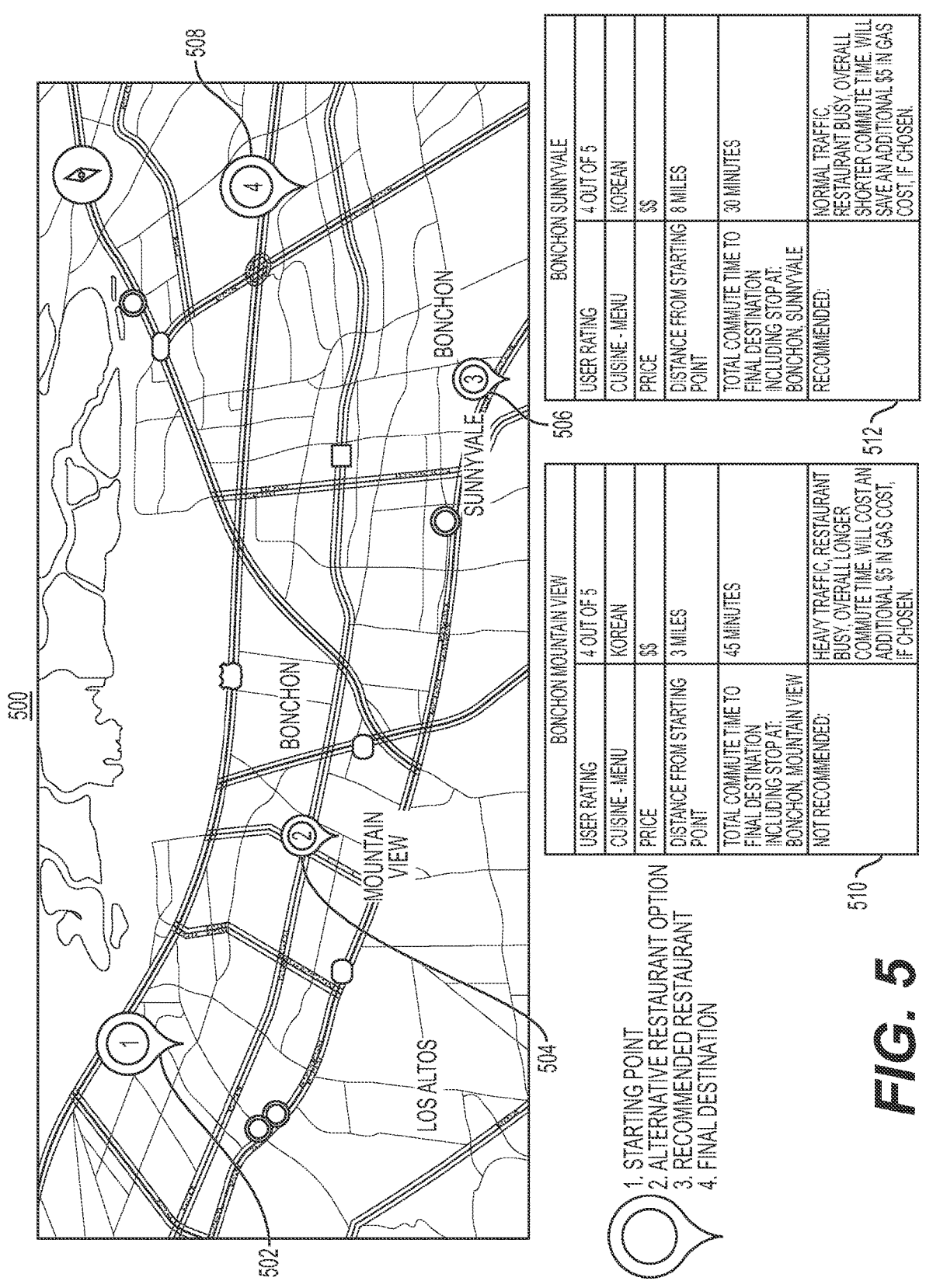
FIG. 5 depicts a graphical representation of traffic data, location recommendations on a map, recommendation rationales, and a visual representation of content presented to a user in an interface.

FIG. 5 depicts a graphical representation of traffic data, location recommendations on a map, recommendation rationales, and a visual representation of content presented to a user in an interface. Recommendation decision map 500 depicts an exemplary format by which cartography information is displayed to an administrator of the RAS 210 or to a user accessing the RAS 210 via a user interface 302 on a personal computing device 202. Recommendation decision map 500 may include traffic information, recommendation tables, and four locations (however any number of locations are possible): a starting point 502, an alternative restaurant option 504, a recommended restaurant 506, and a final destination 508 (e.g. home address). Recommendation decision map 500 can be generated based on the outcome of the one or more algorithms disclosed above (e.g. the algorithm for recommending a restaurant), parsed data (e.g. frequency data) extrapolated from electronic communications (e.g. emails), and geostatistical data received by the RAS 210 from geospatial devices 206. The traffic data may be extrapolated from the geostatistical data received from the geospatial devices, and further conveyed to the user as a graphical overlay on top of roadways on the recommendation decision map 500. The recommendation tables may reflected data stored in the data warehouse 210a and further may be provided to the user in a user interface 302 as graphical representation of explaining why the recommended restaurant 506 is the optimal choice for selecting a restaurant, in comparison to the alternative restaurant option 504, when on the user's route from the starting point 502 to the user's final destination 508.

One having ordinary skill in the art will recognize that the aforementioned examples and embodiments are not meant to be limiting and can be implemented in combination with any disclosed features or other examples and embodiments. Furthermore, while the terms user, member, and user group are defined, one having ordinary skill in the art that like terms, for example, first user, second user, third user, and so on, when used, are meant to precisely identify one or more individuals categorized as either a user, member, or user group.

What is claimed is:

1. A computer-implemented method for recommending where to conduct a transaction comprising:
   receiving, at a server, user input data corresponding to a user device of a user comprising a first location and an objective;
   analyzing, by a recommendation execution cluster, network bandwidth and network latency between the user device and a plurality of data warehouses to determine a data warehouse, among the plurality of data warehouses, with a lowest network latency relative to the user device or in closest geographic proximity to the user device;
   migrating, based on the analyzing, the received user input data to the determined data warehouse with the lowest network latency relative to the user device or in closest geographic proximity to the user device;

generating, by a recommendation application system, a geographic boundary around the first location, based on the received user input data;
   determining, by the recommendation application system, traffic information corresponding to a route from the first location to one or more candidate locations within the geographic boundary, the traffic information extrapolated from multiple geospatial devices;
   parsing, by the recommendation application system, one or more electronic communications of the user to determine frequency data associated with transactions of the user;
   determining, by the recommendation application system, correlated frequency data based on the frequency data that corresponds to the first location and the objective;
   ranking, by the recommendation application system, the one or more candidate locations by assigning a weight to the one or more candidate locations based on the correlated frequency data;
   determining, by the recommendation application system, a candidate location recommendation and a candidate location rationale based on the traffic information and the candidate location recommendation having a highest assigned weight and a greater cost and time savings over completing the objective on a website; and
   transmitting the candidate location recommendation and the candidate location rationale to a dynamic display on the user device, wherein the dynamic display includes a heat map based on the frequency data.

2. The computer-implemented method of claim 1, wherein determining traffic information further comprises:
   receiving historical and real-time geospatial data from one or more geospatial devices including at least a GPS system.

3. The computer-implemented method of claim 1, further comprising:
   receiving one or more global monetary data points corresponding to one or more web addresses and the objective; and
   receiving one or more location specific monetary data points corresponding to the objective, wherein the location specific monetary data points correspond to one or more second locations within the geographic boundary.

4. The computer-implemented method of claim 1, further comprising:
   creating a user recommendation profile comprised of at least the user input data, user identifying information, and the recommended candidate location;
   determining a geographical storage location, corresponding to at least one server, to store the created user profile based on the received first location; and
   storing the user profile in the at least one server in closest proximity to the received first location.

5. The computer-implemented method of claim 1, further comprises:
   determining the frequency in which the user has conducted a transaction at one or more web address and one or more candidate locations by at least incrementing a counter tracking a number of parsed emails wherein monetary data points can be extrapolated therein.

6. The computer-implemented method of claim 1, wherein the recommended candidate location with the highest assigned weight is displayed in an interstitial region alongside additional content in a dynamic virtual environment, wherein the dynamic virtual environment is one or more of a communication application, a web page, and an operating system native to a computing device.

7. The computer-implemented method of claim 1, wherein ranking the one or more candidate locations further comprises:

implementing one or more of geocoding techniques, reverse geocoding techniques, and geo-multi-criteria decision analysis.

8. A system for recommending where to conduct a transaction, comprising:

a storage device that stores instructions; and at least one processor that executes instructions for:

receiving, at a server, user input data corresponding to a user device of a user comprising a first location and an objective;

analyzing, by a recommendation execution cluster, network bandwidth and network latency between the user device and a plurality of data warehouses to determine a data warehouse, among the plurality of data warehouses, with a lowest network latency relative to the user device or in closest geographic proximity to the user device;

migrating, based on the analyzing, the received user input data to the determined data warehouse with the lowest network latency relative to the user device or in closest geographic proximity to the user device;

generating, by a recommendation application system, a geographic boundary around the first location, based on the received user input data;

determining, by the recommendation application system, traffic information corresponding to a route from the first location to one or more candidate locations within the geographic boundary, the traffic information extrapolated from multiple geospatial devices;

parsing, by the recommendation application system, one or more electronic communications of the user to determine frequency data associated with transactions of the user;

determining, by the recommendation application system, correlated frequency data based on the frequency data that corresponds to the first location and the objective;

ranking, by the recommendation application system, the one or more candidate locations by assigning a weight to the one or more candidate locations based on the correlated frequency data;

determining, by the recommendation application system, a candidate location recommendation and a candidate location rationale based on the traffic information and the candidate location recommendation having a highest assigned weight and a greater cost and time savings over completing the objective on a website; and transmitting the candidate location recommendation and the candidate location rationale to a dynamic display on the user device, wherein the dynamic display includes a heat map based on the frequency data.

9. The system of claim 8, wherein determining traffic information further comprises:

receiving historical and real-time geospatial data from one or more geospatial devices including at least a GPS system.

10. The system of claim 8, further comprising:

receiving one or more global monetary data points corresponding to one or more web addresses and the objective; and receiving one or more location specific monetary data points corresponding to the objective, wherein the location specific monetary data points correspond to one or more second locations within the geographic boundary.

11. The system of claim 8, further comprising:

creating a user recommendation profile comprised of at least the user input data, user identifying information, and the recommended candidate location;

determining a geographical storage location, corresponding to the at least one server, to store the created user profile based on the received first location; and storing the user profile in the at least one server in closest proximity to the received first location.

12. The system of claim 8, further comprises:

determining the frequency in which the user has conducted a transaction at one or more web address and one or more candidate locations by at least incrementing a counter tracking a number of parsed emails wherein monetary data points can be extrapolated therein.

13. The system of claim 8, wherein the recommended candidate location with the highest assigned weight is displayed in an interstitial region alongside additional content in a dynamic virtual environment, wherein the dynamic virtual environment is one or more of a communication application, a web page, and an operating system native to a computing device.

14. The system of claim 8, wherein ranking the one or more candidate locations further comprises:

implementing one or more of geocoding techniques, reverse geocoding techniques, and geo-multi-criteria decision analysis.

15. A non-transitory computer-readable medium storing instructions for recommending where to conduct a transaction, the instructions configured to cause at least one processor to perform operations comprising:

receiving, at a server, user input data corresponding to a user device of a user comprising a first location and an objective;

analyzing, by a recommendation execution cluster, network bandwidth and network latency between the user device and a plurality of data warehouses to determine a data warehouse, among the plurality of data warehouses, with a lowest network latency relative to the user device or in closest geographic proximity to the user device;

migrating, based on the analyzing, the received user input data to the determined data warehouse with the lowest network latency relative to the user device or in closest geographic proximity to the user device;

generating, by a recommendation application system, a geographic boundary around the first location, based on the received user input data;

determining, by the recommendation application system, traffic information corresponding to a route from the first location to one or more candidate locations within the geographic boundary, the traffic information extrapolated from multiple geospatial device;

parsing, by the recommendation application system, one or more electronic communications of the user to determine frequency data associated with transactions of the user;

determining, by the recommendation application system, correlated frequency data based on the frequency data that corresponds to the first location and the objective;

ranking, by the recommendation application system and, the one or more candidate locations by assigning a weight to the one or more candidate locations based on the correlated frequency data;

determining, by the recommendation application system, a candidate location recommendation and a candidate location rationale based on the traffic information and the candidate location recommendation having a highest assigned weight and a greater cost and time savings over completing the objective on a website; and transmitting the candidate location recommendation the candidate location and rationale to a dynamic display to a dynamic display on the user device, wherein the dynamic display includes a heat map based on the frequency data.

16. The non-transitory computer-readable medium of claim 15, wherein determining traffic information further comprises:

receiving historical and real-time geospatial data from one or more geospatial devices including at least a GPS system.

17. The non-transitory computer-readable medium of claim 15, further comprising:

receiving one or more global monetary data points corresponding to one or more web addresses and the objective; and receiving one or more location specific monetary data points corresponding to the objective, wherein the location specific monetary data points correspond to a one or more second locations within the geographic boundary.

18. The non-transitory computer-readable medium of claim 15, further comprising:

creating a user recommendation profile comprised of at least the user input data, user identifying information, and the recommended candidate location;

determining a geographical storage location, corresponding to the at least one server, to store the created user profile based on the received first location; and storing the user profile in the at least one server in closest proximity to the received first location.

19. The non-transitory computer-readable medium of claim 15, wherein the recommended candidate location with the highest assigned weight is displayed in an interstitial region alongside additional content in a dynamic virtual environment, wherein the dynamic virtual environment is one or more of a communication application, a web page, and an operating system native to a computing device.

20. The non-transitory computer-readable medium of claim 15, wherein ranking the one or more candidate locations further comprises:

implementing one or more of geocoding techniques, reverse geocoding techniques, and geo-multi-criteria decision analysis.

* * * * *